United States Patent
Flanagan et al.

(10) Patent No.: US 12,424,969 B2
(45) Date of Patent: Sep. 23, 2025

(54) NANOGRID DEVICE FOR OFF-GRID POWER

(71) Applicant: Sesame Solar, Inc., Jackson, MI (US)

(72) Inventors: Lauren A. Flanagan, Fennville, MI (US); Adam M. Kasefang, Addison, MI (US); Sakshi Jindal, New Delhi (IN); Namit Jhanwar, Northville, MI (US)

(73) Assignee: Sesame Solar, Inc., Jackson, MI (US)

( * ) Notice: Subject to any disclaimer, the term of this patent is extended or adjusted under 35 U.S.C. 154(b) by 0 days.

(21) Appl. No.: 18/171,716

(22) Filed: Feb. 21, 2023

(65) Prior Publication Data

US 2023/0268871 A1 Aug. 24, 2023

Related U.S. Application Data

(60) Provisional application No. 63/312,243, filed on Feb. 21, 2022.

(51) Int. Cl.
| | |
|---|---|
| *H02S 30/20* | (2014.01) |
| *B60L 53/30* | (2019.01) |
| *B60L 53/51* | (2019.01) |
| *B60L 53/54* | (2019.01) |
| *H01M 8/04082* | (2016.01) |
| *H01M 8/04089* | (2016.01) |
| *H01M 8/0656* | (2016.01) |
| *H02J 7/35* | (2006.01) |

(Continued)

(52) U.S. Cl.
CPC ............. *H02S 30/20* (2014.12); *B60L 53/30* (2019.02); *B60L 53/51* (2019.02); *B60L 53/54* (2019.02); *H01M 8/04089* (2013.01); *H01M 8/04201* (2013.01); *H01M 8/0656* (2013.01); *H02J 7/35* (2013.01); *H02S 10/10* (2014.12); *H02S 10/40* (2014.12); *H02S 20/30* (2014.12); *H01M 2250/10* (2013.01)

(58) Field of Classification Search
CPC ....... H01L 31/00–078; Y02E 10/50–60; H02S 10/00–40; H02S 20/30–32; H02S 30/20; H10F 10/00–19; H10F 19/00–908; H10F 77/00–959
USPC .................................. 136/243–265
See application file for complete search history.

(56) References Cited

U.S. PATENT DOCUMENTS

| | | |
|---|---|---|
| 9,917,471 B2 | 3/2018 | Wheatley et al. |
| 11,404,995 B2 | 8/2022 | Kasefang et al. |

(Continued)

FOREIGN PATENT DOCUMENTS

WO 2018234269 A1 12/2018

OTHER PUBLICATIONS

International Search Report and Written Opinion for Application No. PCT/US2023/062914 dated Oct. 4, 2023 (14 pages).

*Primary Examiner* — Bach T Dinh
(74) *Attorney, Agent, or Firm* — Varnum LLP

(57) ABSTRACT

A nanogrid device for off-grid power includes a housing and a plurality of energy-receiving components coupled to the housing. The energy-receiving components are movable relative to the housing from a first, stored position to a second, fully deployed position. The energy-receiving components are configured to form an A-frame structure in the second, fully deployed position, and the housing is configured to be disposed underneath the A-frame structure in the second, fully deployed position.

18 Claims, 11 Drawing Sheets

(51) Int. Cl.
  *H02S 10/10* (2014.01)
  *H02S 10/40* (2014.01)
  *H02S 20/30* (2014.01)

(56) References Cited

U.S. PATENT DOCUMENTS

| | | |
|---|---|---|
| 11,742,791 B2 | 8/2023 | Kasefang et al. |
| 2004/0124711 A1* | 7/2004 | Muchow ................. F24S 25/10 |
| | | 307/64 |
| 2006/0137348 A1* | 6/2006 | Pas ........................... F03D 9/19 |
| | | 60/641.1 |
| 2011/0056146 A1 | 3/2011 | Appert |
| 2017/0222475 A1* | 8/2017 | Van Straten ............ H02S 30/20 |
| 2019/0267929 A1* | 8/2019 | Carrington .............. H02S 20/30 |
| 2021/0203269 A1 | 7/2021 | Kasefang et al. |
| 2023/0055234 A1 | 2/2023 | Kasefang et al. |
| 2023/0318520 A1* | 10/2023 | Fuchs ..................... H02S 30/20 |
| | | 136/251 |

\* cited by examiner

NANOGRID DEVICE FOR OFF-GRID POWER

CROSS-REFERENCE TO RELATED APPLICATIONS

This application claims priority to U.S. Provisional Application No. 63/312,243, filed Feb. 21, 2022, the entire contents of which are incorporated herein by reference.

BACKGROUND

Deployment of generators, including those that rely on solar power to generate energy, is often a time-consuming and labor-intensive task. Even setting up a small solar power generator may take up to 30 days, requiring a group of skilled workers to construct and install the solar power generator before the solar power can be used to produce energy. Additionally, current generators do not provide standard interior solutions to use the energy generated by the generators.

SUMMARY

In accordance with one embodiment, a nanogrid device for off-grid power includes a housing and a plurality of energy-receiving components coupled to the housing. The energy-receiving components are movable relative to the housing from a first, stored position to a second, fully deployed position. The energy-receiving components are configured to form an A-frame structure in the second, fully deployed position, and the housing is configured to be disposed underneath the A-frame structure in the second, fully deployed position.

In according with another embodiment, a nanogrid device for off-grid power includes a housing having a first side portion and a second side portion disposed opposite the first side portion. The nanogrid device also includes a first stack of energy-receiving components coupled to the first side portion and a second stack of energy-receiving components coupled to the second side portion. The energy-receiving components of the first stack of solar doors are slidable relative to one another, and the solar doors of the second stack of solar doors are slidable relative to one another.

In accordance with another embodiment, a nanogrid device for off-grid power includes a housing and a plurality of energy-receiving components coupled to the housing. The energy-receiving components are movable from a first, stored position to a second, fully deployed position. The nanogrid device also includes a hydrogen fuel cell disposed within the housing, and a hydrogen generation unit or units coupled to hydrogen storage tanks, which in turn are coupled to a hydrogen fuel cell or cells.

Other embodiments and aspects of the various embodiments will become apparent by consideration of the detailed description and accompanying drawings.

DETAILED DESCRIPTION

Before any embodiments are explained in detail, it is to be understood that embodiments are not limited in their application to the details of construction and the arrangement of components set forth in the following description or illustrated in the following drawings. Other embodiments are possible and embodiments described and illustrated are capable of being practiced or of being carried out in various ways.

FIGS. 1-13 illustrate an exemplary embodiment of a nanogrid device 10 for off-grid power generation. The nanogrid device 10 device may be used (e.g., as a mobile generator) to generate power for a variety of purposes, including to provide primary power at a selected destination, to provide auxiliary power at a selected destination such as a utility provider, and/or to provide an electrical vehicle (EV) charging station at a selected destination. The nanogrid device 10 may be used at a variety of different selected destinations, including in urban settings, in rural settings (e.g., in local, state, or national parks), in locations that are remote from an established power grid (e.g., to provide backup power to utility providers during grid outages), and/or in locations that otherwise may benefit from having a dedicated nanogrid device 10. The nanogrid device 10 may be used temporarily (e.g., for a few days or months), or may be used on a more permanent basis, and may be moved as desired between selected destinations.

Figure 1:
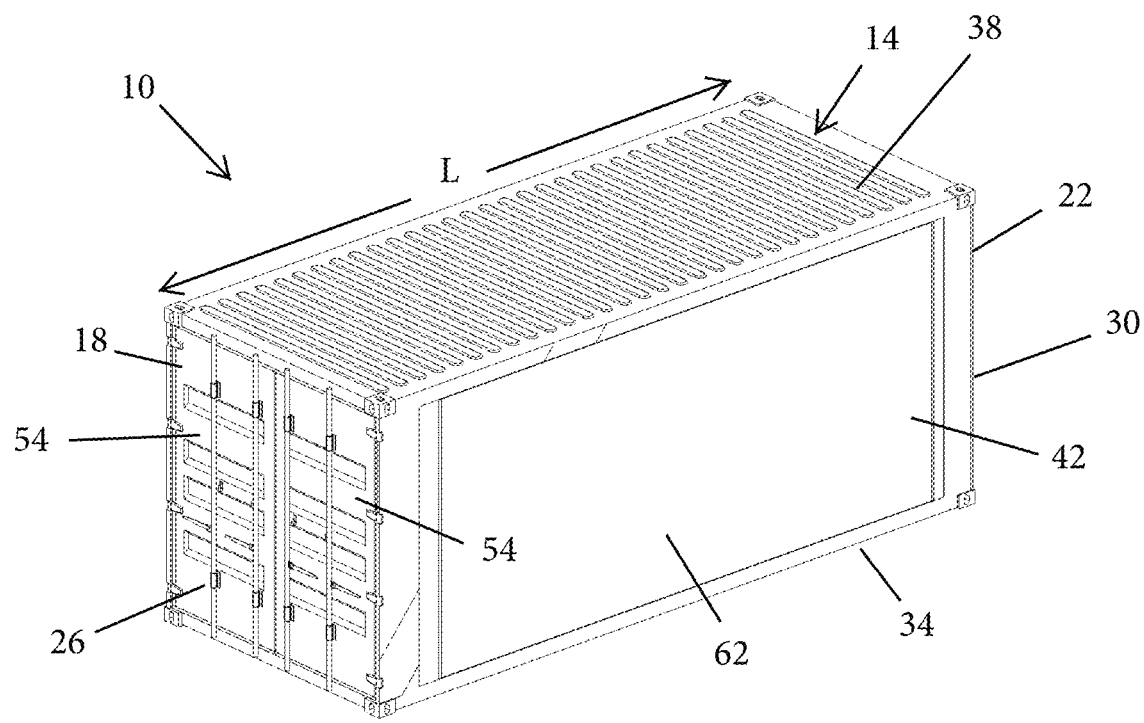
FIGS. 1 and 2 are perspective views of a nanogrid device for off-grid power according to one embodiment.
Figure 2:
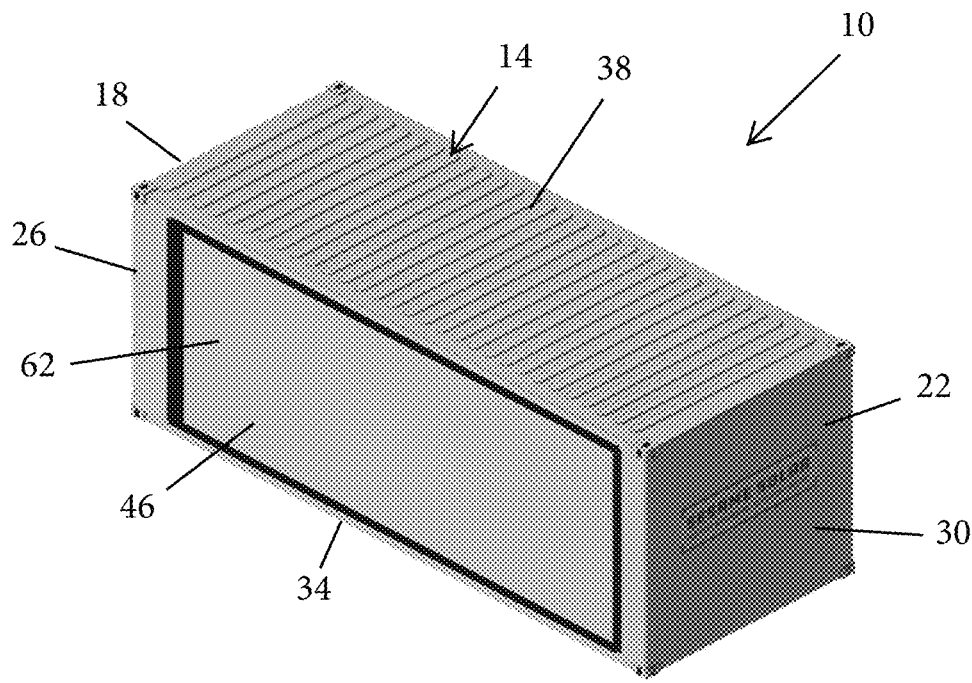

The nanogrid device 10 may be transported to a selected destination, and then deployed into use. For example, in some embodiments the nanogrid may be transported on the back (e.g., flatbed) of a semi or other commercial or industrial vehicle. In the illustrated embodiment, the nanogrid device 10 includes a housing 14. The housing 14 may have a variety of shapes. As illustrated in FIGS. 1 and 2, in some embodiments the housing 14 may form a generally elongate rectangular box having a first end 18, and a second, opposite end 22 spaced from the first end 18 along an elongated length "L" of the housing 14. The length L may vary. For example, the length L may be 10 feet, or 20 feet, 30 feet, 40 feet, a length between 10 feet and 40 feet, or another value or range of values (e.g., less than 10 feet or greater than 40 feet). The length L (and other dimensions of the housing 14) may be chosen based for example on the number of nanogrid devices 10 that are being transported, and also the size for example of the flatbed being used to transport the nanogrid devices 10. In the illustrated embodiment, the housing 14 is in the shape of a rectangular cargo container (e.g., a container express, or "CONEX" container), for ease of shipment and transport on the back of a vehicle. In other embodiments the housing 14 may have a square shape, a trapezoidal shape, or any other desired shape.

In some embodiments, the nanogrid device 10 may be positioned on top, or form part of, a trailer (e.g., dual axle trailer) during transport of the nanogrid device 10 to the selected destination. The trailer may include for example a hitch that may be coupled to the back of a separate vehicle, and a wheeled flatbed that extends behind the hitch. The housing 14 of the nanogrid device 10 may rest on (or be integrated as part of and as a single piece with) the flatbed during transport. The trailer may have a length, for example, of 14 feet, 16 feet, 18 feet, 20 feet, or another value between 14 feet and 20 feet, although other embodiments may include different values and ranges of values (e.g., less than 14 feet or greater than 20 feet).

Once at a selected destination, the nanogrid device 10 may be lifted and/or lowered from a vehicle and into position (e.g., via a crane, forklift, or other machine). The housing 14 may include one or more features (e.g., guides, rails, eyelets, or other structures) that facilitate lifting and/or lowering the nanogrid device 10 into place at the selected destination. Once the nanogrid device 10 is in place at the selected destination, the nanogrid device 10 may then be deployed.

Figure 3:
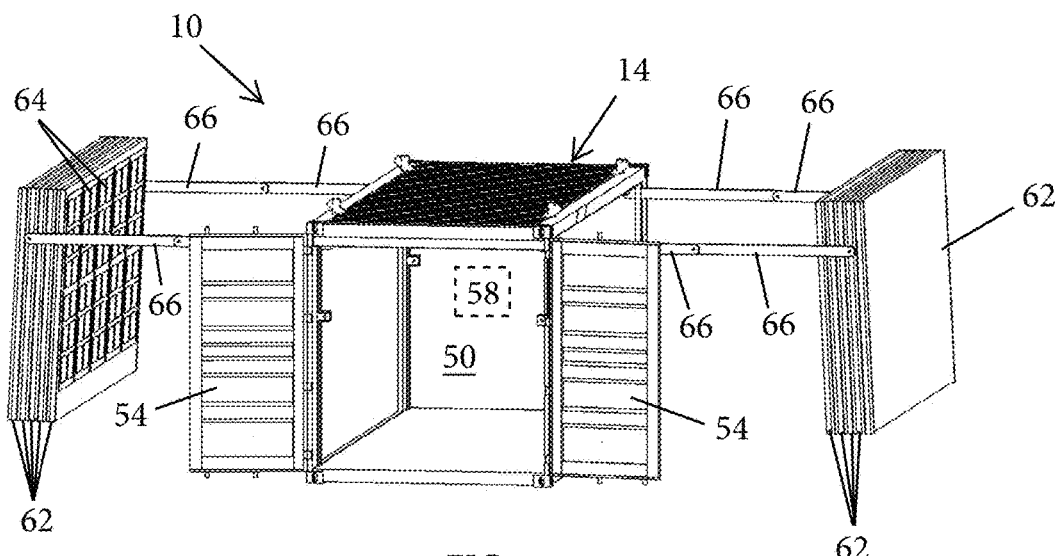
FIG. 3 is a perspective view of the nanogrid device, illustrating a first deployment step.

With references to FIGS. 1-3, the housing 14 may be made partially or entirely, for example, from metal, stainless steel, carbon fiber, fiberglass, wood, plastics, synthetics, or other suitable materials. The housing 14 may include a front portion 26, a rear portion 30 disposed opposite the front portion 26, a bottom portion 34, a top portion 38 disposed opposite the bottom portion 34, a first side portion 42, and a second side portion 46 disposed opposite the first side portion 42. The front portion 26, the rear portion 30, the bottom portion 34, the top portion 38, the first side portion 42, and the second side portion 46 together define an interior portion 50 (FIG. 3).

With continued reference to FIGS. 1-3, in the illustrated embodiment the front portion 26 includes two doors 54 that swing open, revealing the interior portion 50, and the rear portion 30 includes a stationary wall. In other embodiments only a single door 54 is provided, and/or the rear portion 30 also includes at least one door that swings open to reveal the interior portion 50. In yet other embodiments the housing 14 includes no swinging doors. Rather, the front portion 26 and the rear portion 30 are each stationary. In some embodiments, the nanogrid device 10 includes at least one electronic component 58 (e.g., controller, circuitry, or other electronic component). The electronic component 58 may be coupled to the rear portion 30 (or another portion of the housing 14), and may be disposed for example within the interior portion 50, or may be coupled to an exterior of the housing 14. In other embodiments the nanogrid device 10 does not include an electronic component 58.

With reference to FIGS. 1-13, the nanogrid device 10 includes at least one portion that is configured to receive energy from an external environment and to generate power and/or electricity from that energy. For example, in the illustrated embodiment the nanogrid device 10 includes one or more energy-receiving components in the form of solar doors 62 (e.g., a first stack of five solar doors 62) coupled to the first side portion 42 and one or more solar doors 62 (e.g., a second stack of five solar doors 62) coupled to the second side portion 46. The solar doors 62 are in a stored position in FIGS. 1 and 2 and in a fully deployed position in FIG. 13. Each solar door 62 may include one or more solar panels 64 disposed thereon that receive energy from the sun and convert the energy from the sun into electrical energy. The solar panels 64 may face inwardly into the housing 14 in the stored position (e.g., to inhibit damage to the solar panels 64).

Figure 13:
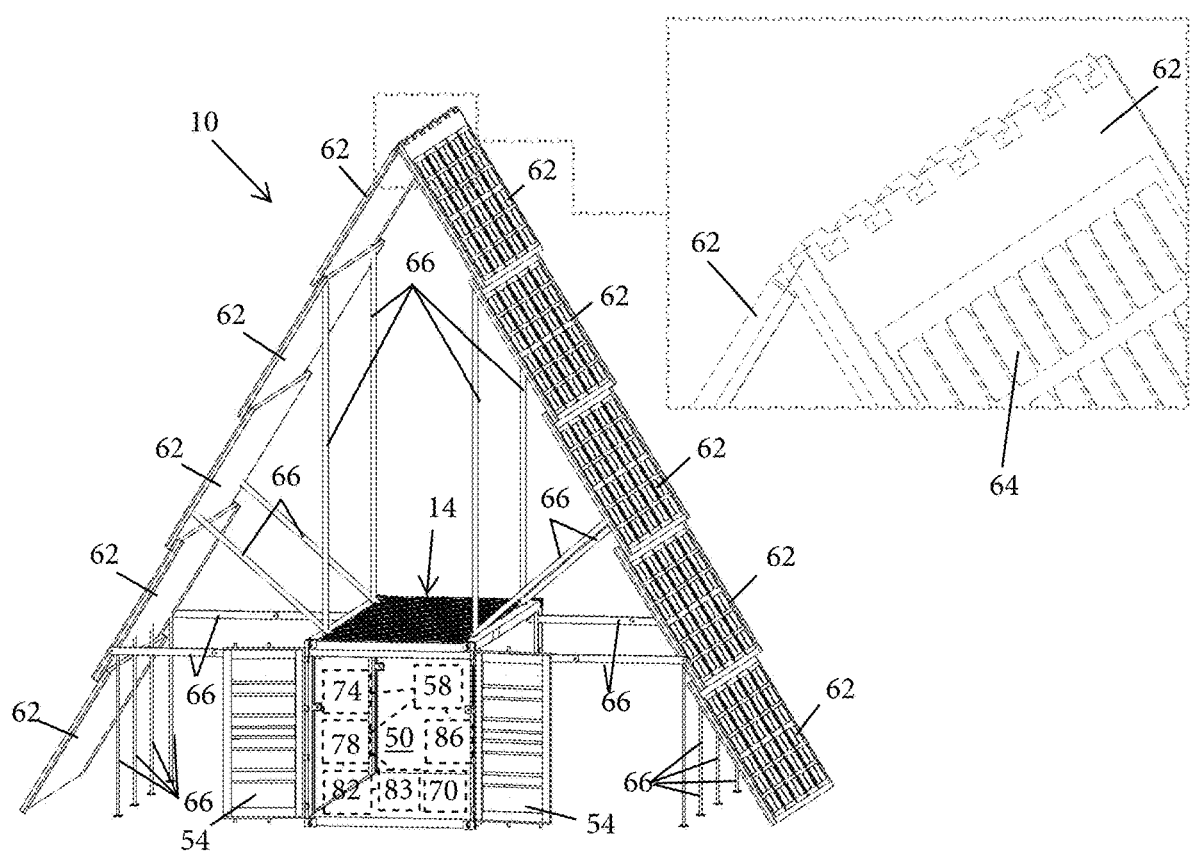
FIG. 13 is a perspective view of the nanogrid device, illustrating an eleventh deployment step.
Figure 14:
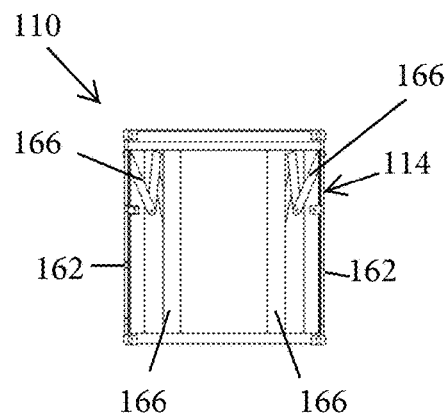
FIGS. 14 and 15 are front and perspective views of a nanogrid device for off-grid power according to another embodiment.
Figure 15:
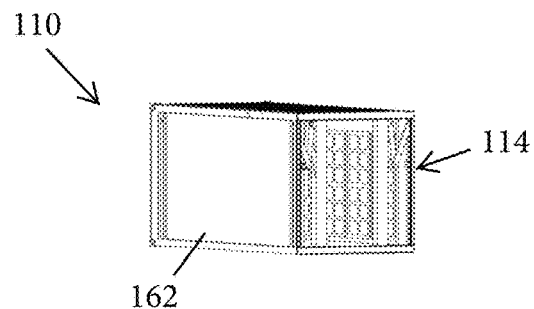
Figure 16:
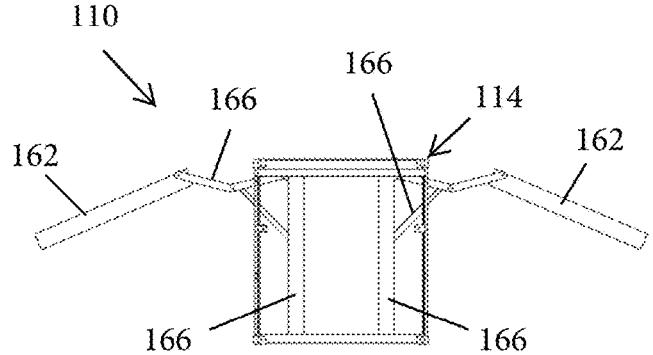
FIGS. 16 and 17 are front and perspective views of the nanogrid device of FIGS. 14 and 15, illustrating a first deployment step.
Figure 17:
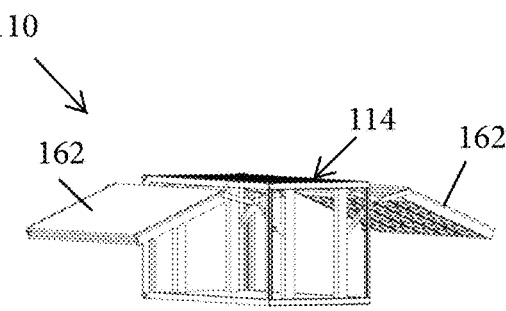
Figure 18:
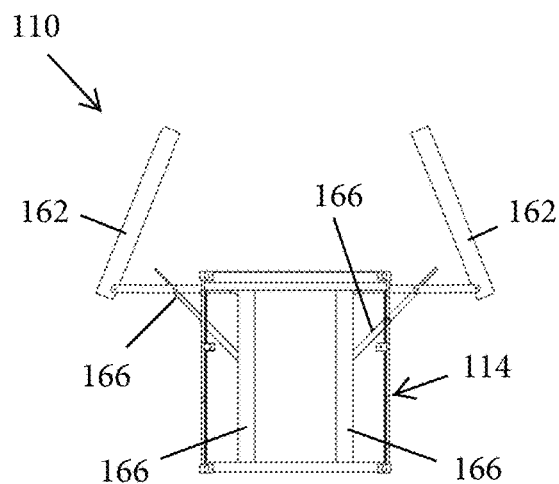
FIGS. 18 and 19 are front and perspective views of the nanogrid device of FIGS. 14 and 15, illustrating a second deployment step.
Figure 19:
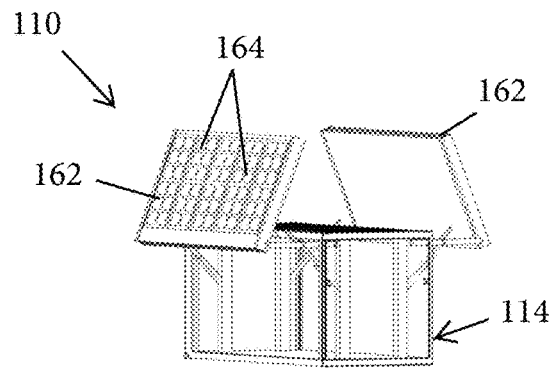
Figure 20:
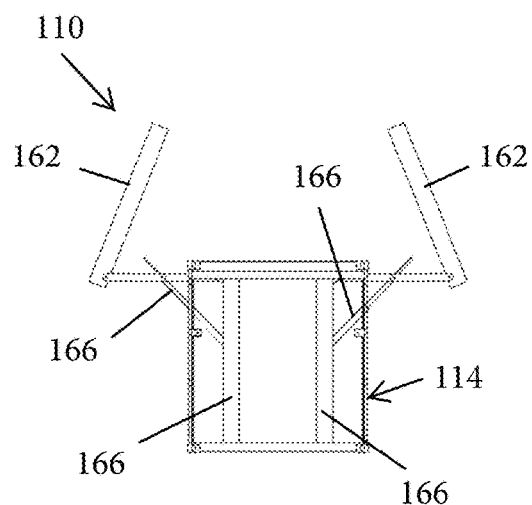
FIGS. 20 and 21 are front and perspective views of the nanogrid device of FIGS. 14 and 15, illustrating a third deployment step.
Figure 21:
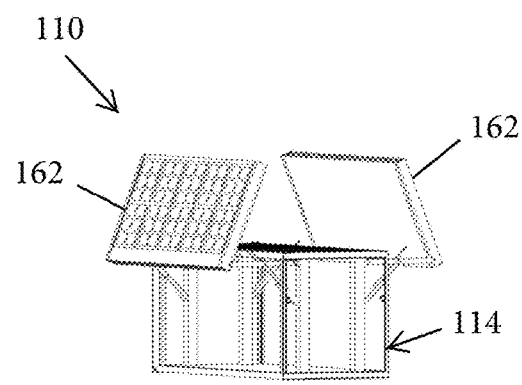
Figure 22:
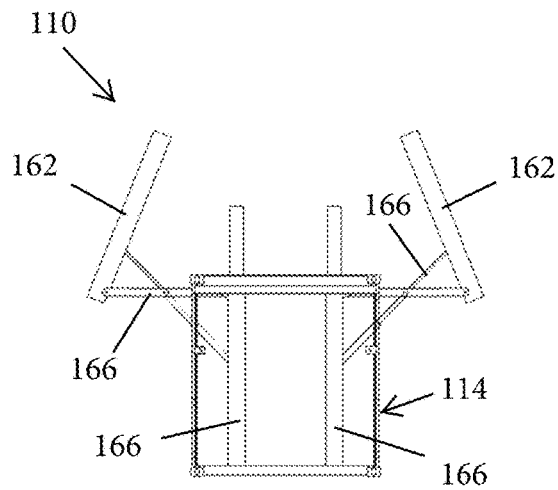
FIGS. 22 and 23 are front and perspective views of the nanogrid device of FIGS. 14 and 15, illustrating a fourth deployment step.
Figure 23:
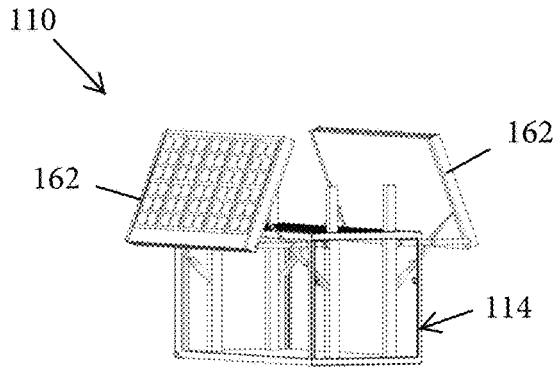
Figure 24:
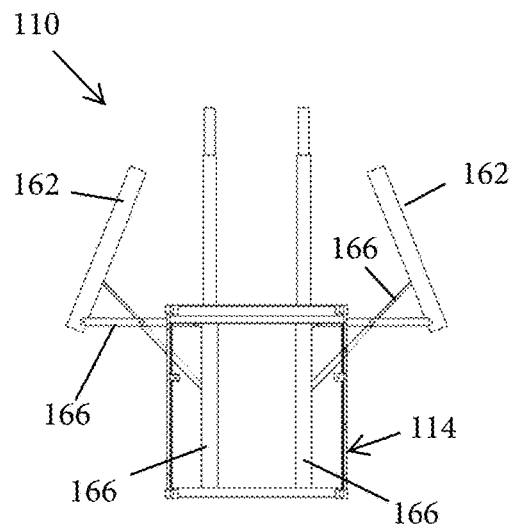
FIGS. 24 and 25 are front and perspective views of the nanogrid device of FIGS. 14 and 15, illustrating a fifth deployment step.
Figure 25:
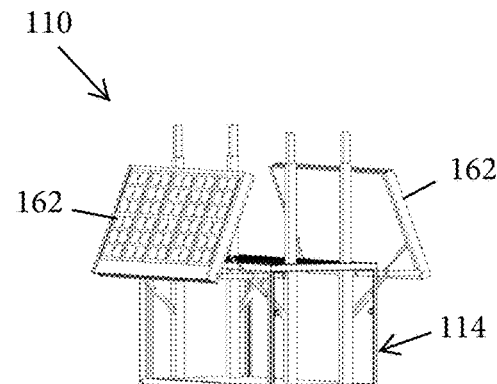
Figure 26:
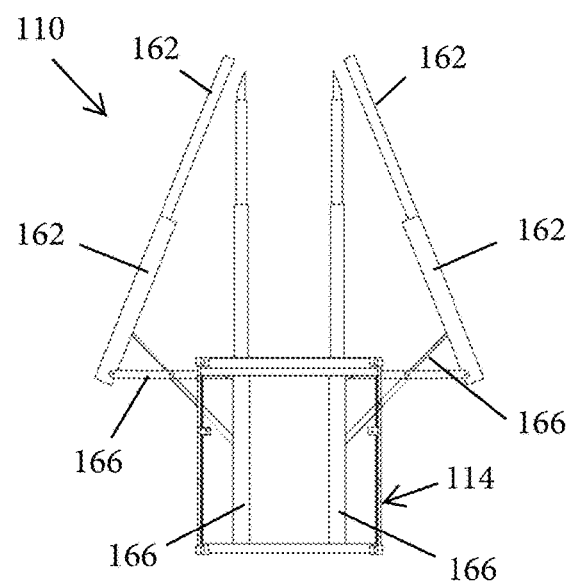
FIGS. 26 and 27 are front and perspective views of the nanogrid device of FIGS. 14 and 15, illustrating a sixth deployment step.
Figure 27:
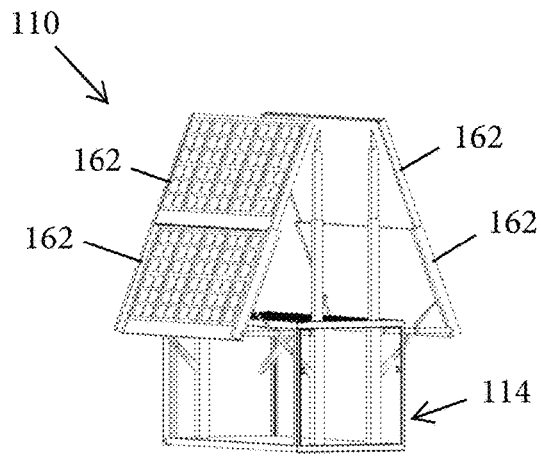

The solar doors 62 may include or be coupled to electronic actuators, telescopic poles, magnetic locks, and/or high-tension spring mechanisms to open and deploy the nanogrid device 10 (e.g., into a general A-frame configuration as seen in FIG. 13). In the illustrated embodiment, the nanogrid device 10 includes supporting frame members 66 (e.g., telescoping poles) that support the solar doors 62. In some embodiments, the nanogrid device 10 additionally or alternatively includes one or more wind-powered components on the housing 14 that receive energy from the wind and convert the energy into electricity. The nanogrid device 10 may also or alternatively include one or more components that receive light energy, electromechanical energy, electromagnetic energy, infrared energy, and/or electrical energy.

The solar doors 62 may define a solar array (e.g., up to 20 kW) that generates up to 200 kWh, and each of the solar doors 62 may have a size for example between 300 W and 500 W. Other embodiments include different numbers and sizes of solar doors 62 than that illustrated, and other amounts of power (e.g., less than 20 kW or more than 20 kW) and generated energy (e.g., less than 200 kWh or more than 200 kWh). In some embodiments, one or more of the solar doors 62 may form a fully integrated array having an inverter, charge controller, solar combiner, battery storage, and/or electronics.

With reference to FIG. 13, and as described above, the nanogrid device 10 may provide power for a variety of purposes, including for backup power or electric vehicle charging. Thus, in some embodiments the nanogrid device 10 may be used (e.g., in a parking lot) as a charging station for an electric vehicle, and may include electric vehicle supply equipment (EVSE). For example, in some embodiments the nanogrid device 10 may include a plug-in (e.g., EVSE port) 70 for an electric vehicle. The plug-in 70 may be located within the housing 14 and in the interior portion 50, or instead may be located along an exterior of the housing 14, or spaced from the housing 14. The vehicle may drive up to the plug-in 70 (e.g., either driving up alongside the nanogrid device 10, or for example actually driving at least partially into the housing 14 of the nanogrid device 10), or driving between the housing 14 and the solar doors 62 (e.g., under the horizontal supporting frame members 66 illustrated in FIG. 13), and then park and plug into the plug-in 70 (e.g., by using an EVSE cable).

The energy received by the energy-receiving components (e.g., the solar doors 62) may be sent for example to the electronic component 58, and may be stored in the electronic component 58 or used immediately on-site to provide power and/or electricity (e.g., to the plug-in 70 or to another component). In some embodiments the electronic component 58 may use/transfer the energy from the solar doors 62 into a voltage for use immediately on-site.

In some embodiments, the interior portion 50 of the housing 14 may include equipment that is powered by the energy collected by the energy-receiving components. For example, in addition to the plug-in 70 (or alternatively from the plug-in 70), the housing 14 may include equipment related to an office, warehouse/storage, refrigerator, medical clinic, pharmacy, water filtration/pumping/air-to-water generation station, retail store, communication center, disaster response/recovery office, library, classroom, utility provider and/or military use. Other embodiments may include for example only the plug-in 70, or only the types of alternative equipment described above.

In some embodiments, and with reference to FIG. 13, the housing 14 may include wireless communications equipment 74. The wireless communications equipment 74 may be connected for example to the electronic component 58 (e.g., to an electronic circuitry of the electronic component 58) for receiving and/or transmitting at least one wireless communication signal from a remote location. The wireless communications equipment 74 may include sensors that monitor one or more aspects of the nanogrid device 10 (e.g., positions of the solar doors 62, an energy supply being generated by the solar doors 62, etc.) and send a signal to a remote location. In some embodiments, the wireless communications equipment 74 may be used to assist with deployment of the solar doors 62 (e.g., may communicate with motion controllers or actuators), such that deployment may occur remotely. The nanogrid device 10 may thus be monitored and/or controlled remotely. The wireless communications equipment 74 may be located, for example, on or within the housing 14.

With continued reference to FIG. 13, the nanogrid device 10 may additionally include a back-up source of power. For example, in the illustrated embodiment the nanogrid device 10 includes a hydrogen fuel cell or cells 78 disposed on or within the housing 14. The hydrogen fuel cells 78 may generate, for example, up to 20 kW of back-up power (e.g., for the plug-in 70 and/or for the electronic component 58 and/or other equipment as described above), in the event that the solar doors 62 are not producing sufficient real-time energy (e.g., due to weather conditions or damage). Other embodiments may include a hydrogen fuel cell 78 that generates different amounts of back-up power. Some embodiments do not include a back-up source of power.

With reference to FIG. 13, in some embodiments the nanogrid device 10 may include a hydrogen generation unit 82 that generates hydrogen for the hydrogen fuel cell or cells 78, such that while the solar doors 62 are providing power from available sunlight, at least a portion of the energy generated by solar doors 62 may be used to produce hydrogen (through electrolysis) within the hydrogen generation unit 82. The hydrogen may be stored in hydrogen storage tanks 83. The stored hydrogen may then later be used by the hydrogen fuel cell or cells 78 to produce power when back-up power is needed. Other embodiments may not include a hydrogen generation unit 82. In some embodiments, the wireless communications equipment 74 may be used for example to remotely monitor and/or control the use of the hydrogen fuel cells 78 and/or the hydrogen generation unit 82 and/or and the storage tanks 83.

FIGS. 3-13 illustrate an example of a series of deployment steps for the nanogrid device 10.

With reference to FIG. 3, in a first deployment step the solar doors 62 may be moved laterally away (e.g., horizontally) from the frames of the first and second side portions 42, 46. The solar doors 62 may be moved laterally, for example, to between 9 feet and 10 feet away from the frames of the first and second side portions 42, 46, although other embodiments may include different values and ranges (e.g., less than 9 feet or greater than 10 feet). The solar doors 62 on each side of the nanogrid device 10 may generally move together to this first position. In some embodiments, the solar doors 62 may be secured or locked together during this initial movement, and/or also during storage (see FIGS. 1 and 2), to inhibit damage to the solar doors 62.

As illustrated in FIG. 3, the solar doors 62 may be coupled to supporting frame members 66, and the nanogrid device 10 may include one or more actuators (e.g., coupled to the supporting frame members 66 and/or the solar doors 62) that move the solar doors 62 laterally to the position illustrated in FIG. 3. In some embodiments, linear actuators and/or high-tension springs supported by cantilever arms may be used to move the solar doors 62 to the first deployed position. In some embodiments at least some of the supporting frame members 66 may be pivotally coupled to one another and/or to the housing 14. As seen in FIG. 3, the solar panels 64 on the solar doors 62 may be facing inwardly, such that when the nanogrid device 10 is in a fully retracted position (FIGS. 1 and 2) the solar panels 64 are not exposed to an environment outside the nanogrid device 10.

Figure 4:
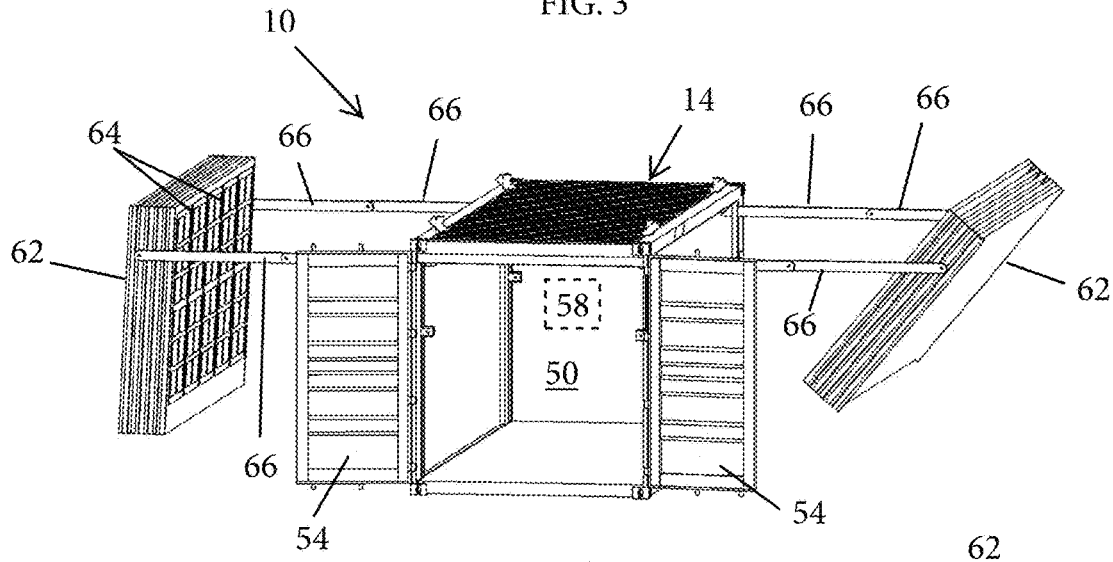
FIG. 4 is a perspective view of the nanogrid device, illustrating a second deployment step.
Figure 5:
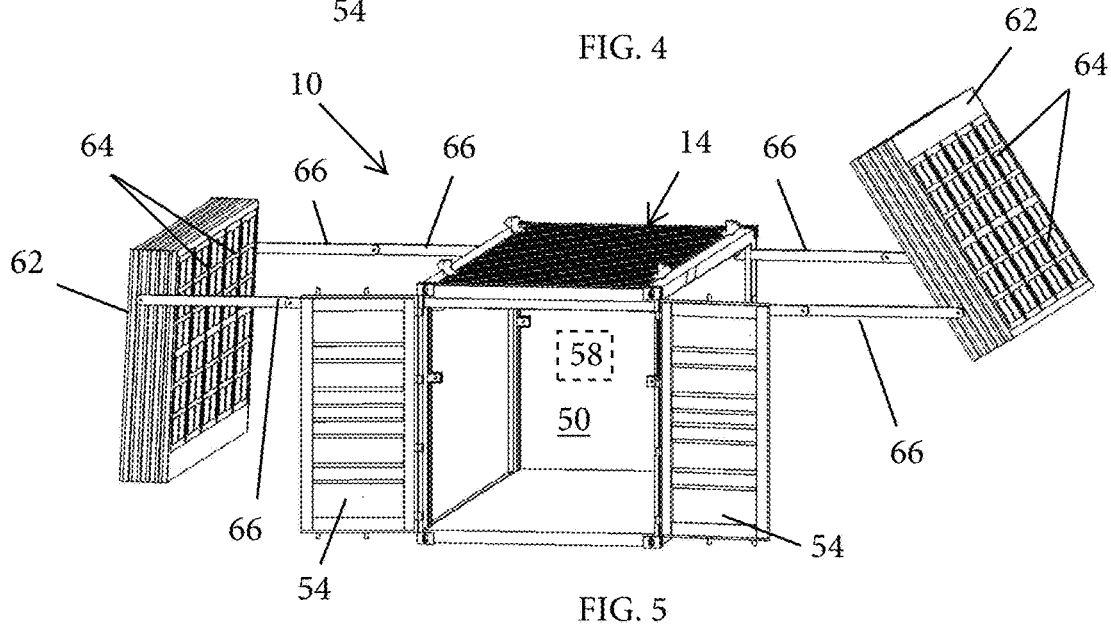
FIG. 5 is a perspective view of the nanogrid device, illustrating a third deployment step.

With reference to FIG. 4, in a second deployment step the solar doors 62 may be rotated (e.g., with rotary actuators and/or motion controllers) about an axis that is parallel to the length L of the housing 14. With reference to FIG. 5, in a third deployment step the solar doors 62 may be rotated farther (e.g., again with rotary actuators and/or motion controllers) about the same axis. In some embodiments, the overall rotation (from the configuration seen in FIG. 3 to the configuration seen in FIG. 5) is approximately 120 degrees. Other embodiments include rotations that are less than 120 degrees or more than 120 degrees.

Figure 6:
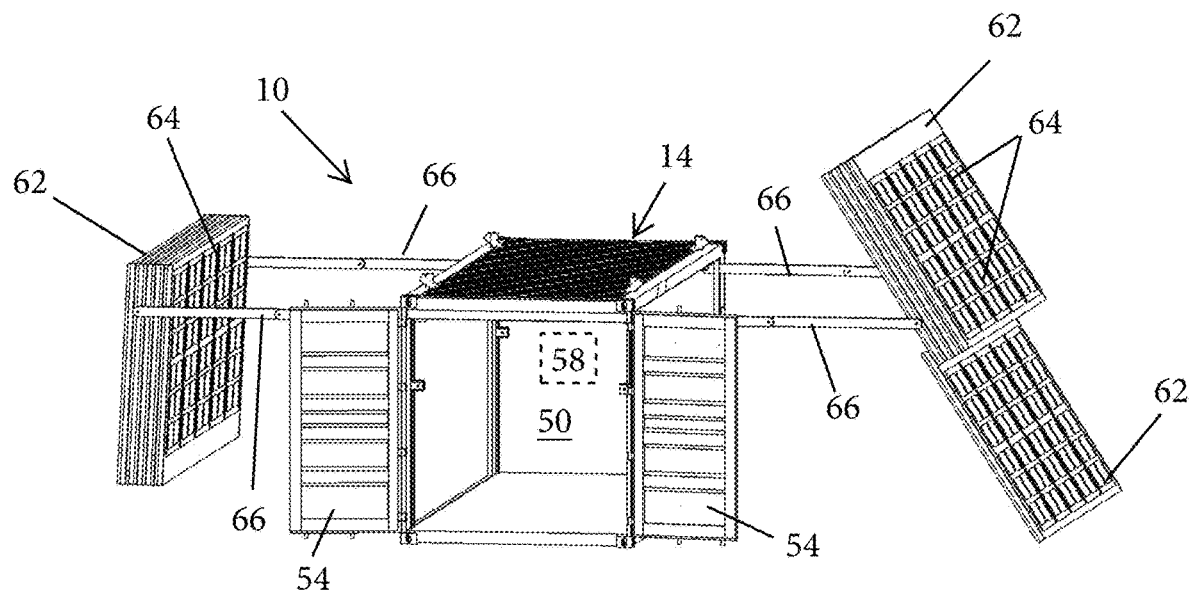
FIG. 6 is a perspective view of the nanogrid device, illustrating a fourth deployment step.
Figure 7:
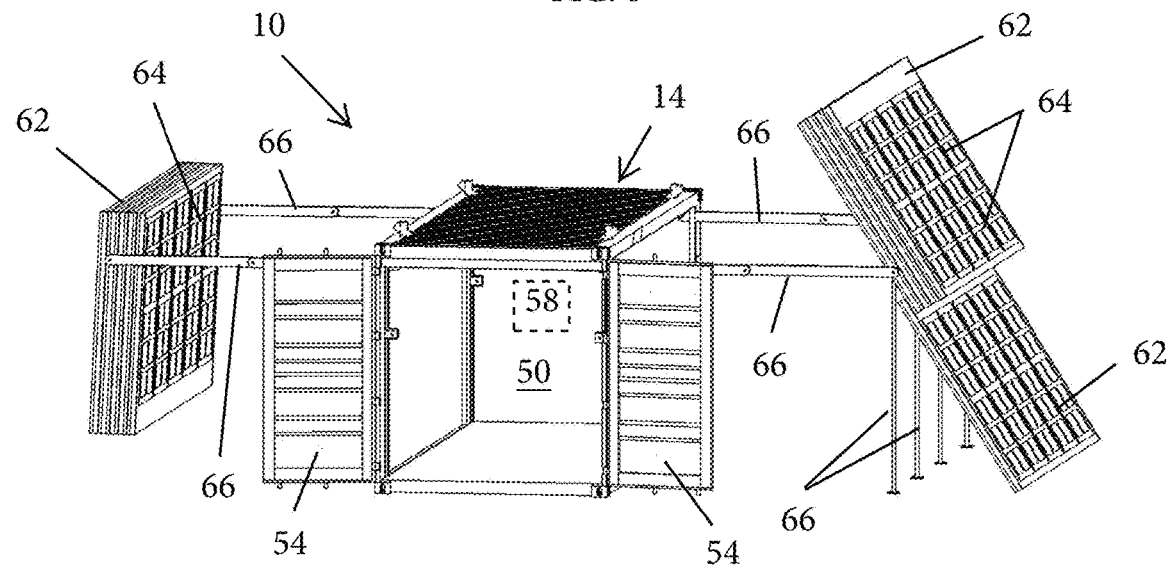
FIG. 7 is a perspective view of the nanogrid device, illustrating a fifth deployment step.

With reference to FIG. 6, in a fourth deployment step a solar door (e.g., an outer most or inner most solar door 62) in the stack of solar doors 62 may slide down relative to the other solar doors 62. This motion may be controlled, for example, with the use of linear actuators. With reference to FIG. 7, in a fifth deployment step, once the solar door 62 is completely lowered, additional supporting frame members 66 (e.g., telescopic support legs) may be deployed (e.g., from a rear of the solar door 62) and hit the ground.

Figure 8:
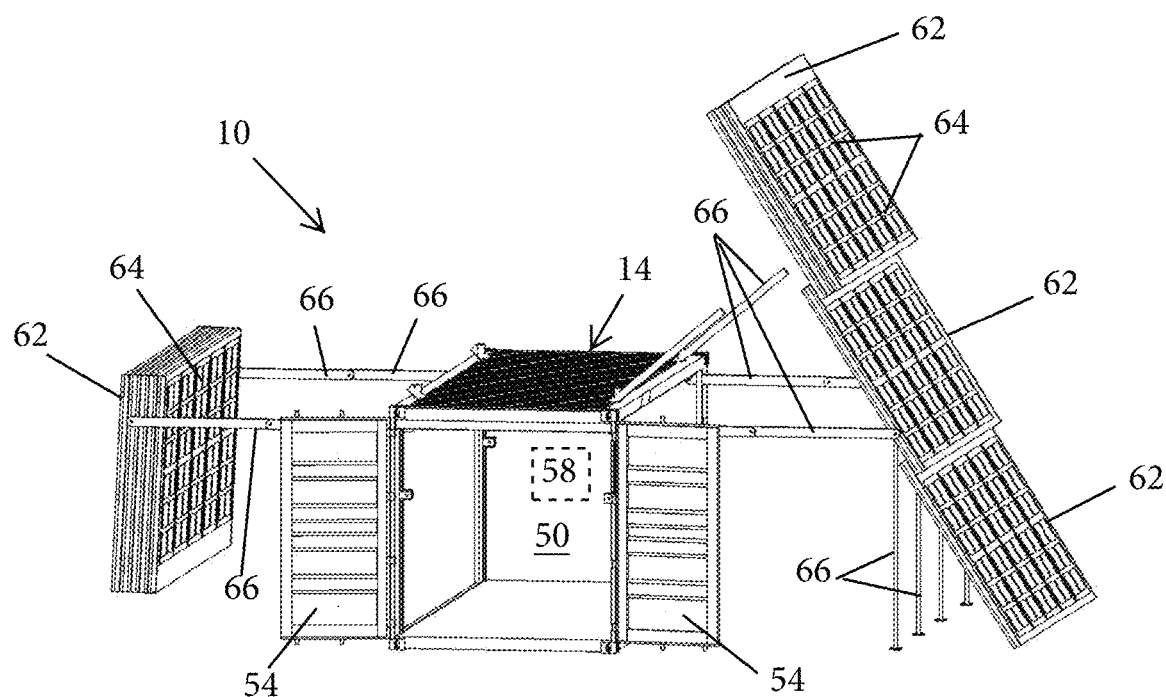
FIG. 8 is a perspective view of the nanogrid device, illustrating a sixth deployment step.
Figure 9:
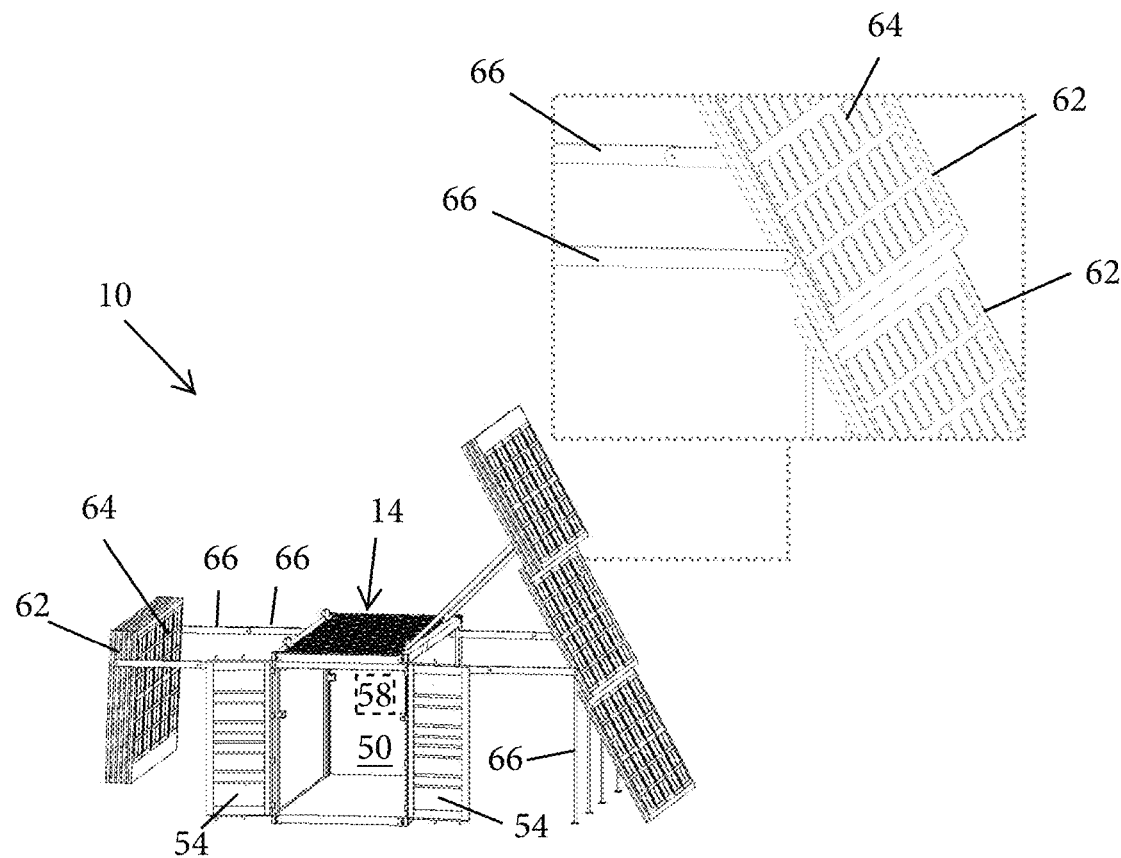
FIG. 9 is a perspective view of the nanogrid device, illustrating a seventh deployment step.

With reference to FIG. 8, in a sixth deployment step another one or more of the solar doors 62 may be moved upwardly (e.g., via a linear actuator). With reference to FIG. 9, once this other solar door 62 has been deployed, additional supporting frame members 66 (e.g., telescopic support legs) may deploy (e.g., from a top of the housing 14) in a seventh deployment step and extend to lock into a rear of the solar door 62.

Figure 10:
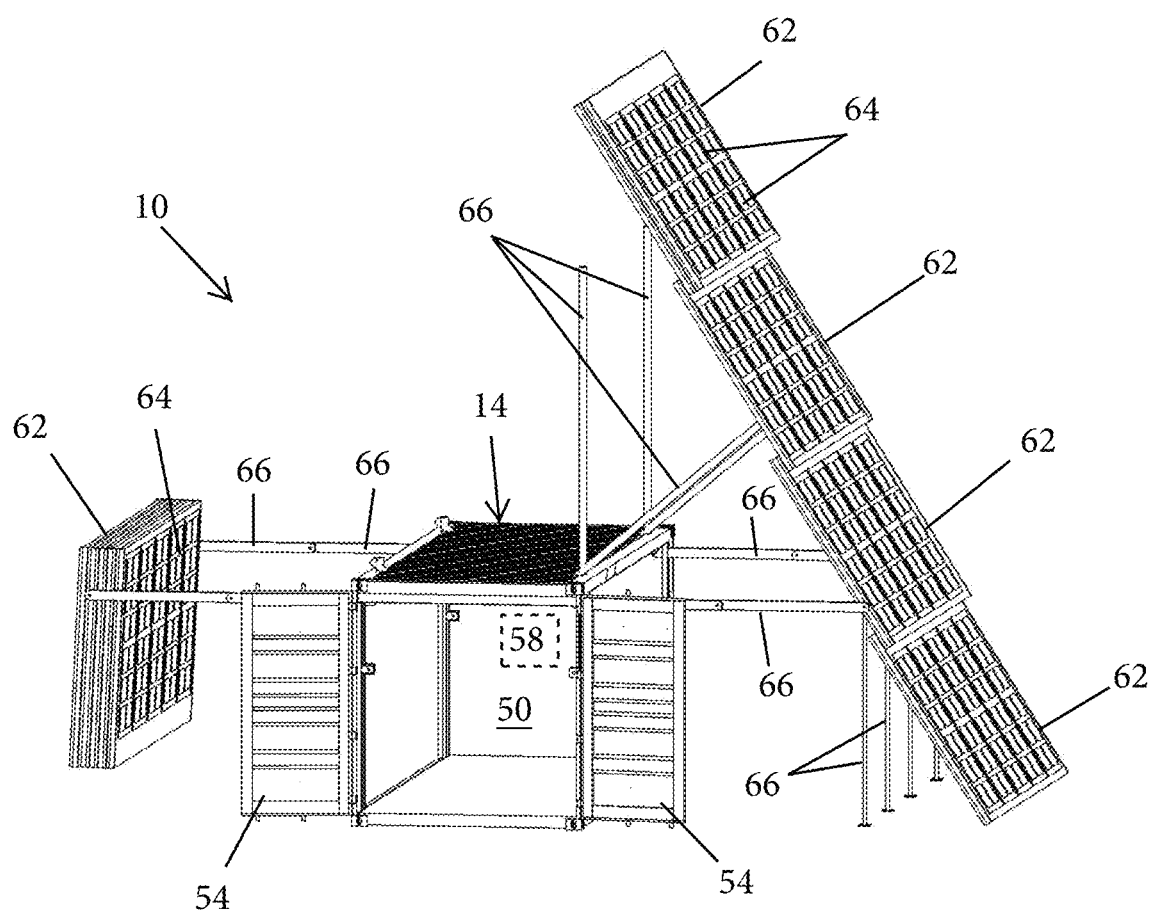
FIG. 10 is a perspective view of the nanogrid device, illustrating an eighth deployment step.
Figure 11:
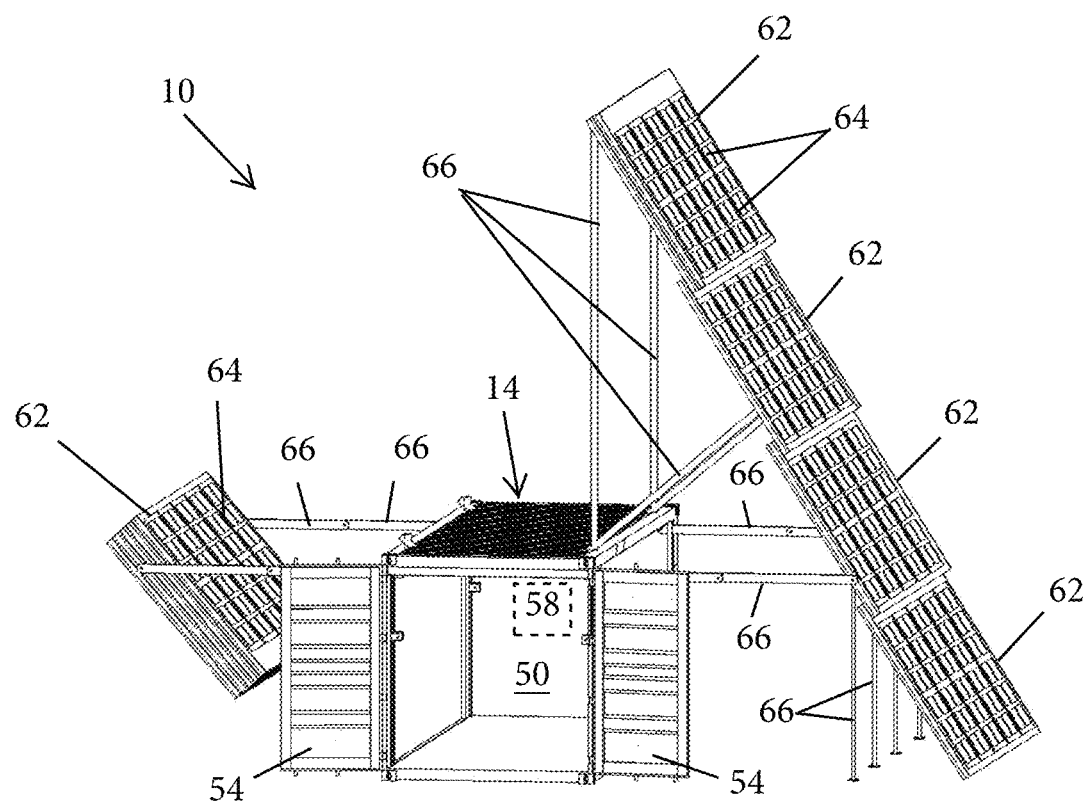
FIG. 11 is a perspective view of the nanogrid device, illustrating a ninth deployment step.

With reference to FIG. 10, in an eighth deployment step another one or more of the solar doors 62 may be moved upwardly (e.g., via a linear actuator). With reference to FIG.

11, in a ninth deployment step, once this other solar door 62 has been deployed, additional supporting frame members 66 (e.g., telescopic support legs) may deploy (e.g., from a top of the housing 14) and extend to lock into a rear of the solar door 62. In each of the fourth through ninth steps the solar doors 62 may slide relative to one another into the positions illustrated in FIGS. 6-11.

Figure 12:
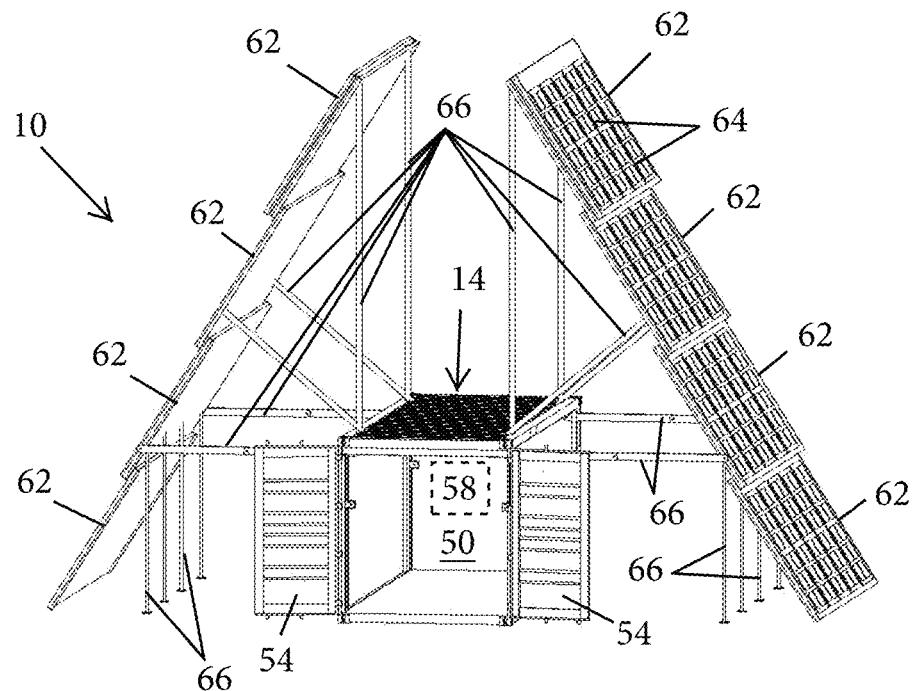
FIG. 12 is a perspective view of the nanogrid device, illustrating a tenth deployment step.

With reference to FIG. 12, in a tenth deployment step the same operations described above may be repeated for the opposite side of the nanogrid device 10 (i.e., with the other stack of solar doors 62), and with reference to FIG. 13, in an eleventh deployment step the solar doors 62 at the top of the nanogrid device 10 may be coupled (e.g., interlocked) together (e.g., at a 60 degree angle or other angle). In other embodiments the solar doors 62 may not be coupled together at the top of the nanogrid device 10.

As illustrated in FIG. 13, in the final fully deployed position the nanogrid device 10 may have an A-frame outer shape, forming for example an equilateral triangle. In this arrangement the solar doors 62 may form two of the three sides of the triangle, and may extend all the way (or for example nearly all the way) to the ground surface. As illustrated in FIG. 13, the housing 14 is disposed underneath the solar doors 62.

While eleven deployment positions are illustrated in FIGS. 3-13, in other embodiments different numbers and sequences of deployment steps may be used. For example, in some embodiments the nanogrid device 10 may use less or more than eleven deployment steps to fully deploy. Additionally, in other embodiments the number of solar doors 62, solar panels 64, and/or supporting frame members 66 may vary.

With reference to FIG. 13, one or more motion controllers 86 may be used to control the movement of the solar doors 62 and the supporting frame member 66. In some embodiments the motion controller or motion controllers 86 include at least one of a hydraulic cylinder, rotary hydraulic actuator, hydraulic power unit, electronic actuator (linear or rotary), electric or manual winch, electric motor (e.g., powered by hydraulic power units or an electric source), chain, steel tubing, fitting, and/or sprocket. The motion controller or controllers 86 may be located on and/or within the housing 14, and/or may be located outside of the housing 14 (e.g., on or between the supporting frame members 66 and/or on or between the solar doors 62). The electronic component 58 may include for example a controller that may be used and/or programmed to control the motion controllers 86. Alternatively, the motion controllers 86 themselves may include one or more controllers (e.g., microcontrollers) that are used and/or programmed to control the motion controllers 86.

Overall, the nanogrid device 10 described herein may be deployed in an easy-to-use manner, and may be deployed for example on-site or deployed remotely (e.g., using the wireless communications equipment 74). In some embodiments, one or more of the deployment steps may be carried out manually on-site (e.g., rather than using motion controllers or actuators). For example, the solar doors 62 may be lifted and/or moved manually. The nanogrid device 10 may require little to no maintenance throughout its lifetime, and may be monitored during use. In some embodiments, no on-site labor is required for installation or deployment. Each nanogrid device 10 may be pre-configured with an interior standard solution to utilize the energy produced. Each nanogrid device 10 may be designed or otherwise used for a particular purpose and energy needed (e.g., as a charging station or other energy source). In some embodiments, one or more nanogrid devices 10 may be used to generate off-grid solar power in various settings ranging from weather emergencies, disaster relief, medial aid, and military transport of supplies. The nanogrid device 10 may both generate power for immediate use, as well as store power for future use. The nanogrid device 10 may operate in isolation as an off-grid energy solution, may be connected for example to a main electrical grid, or may have a hybrid use (i.e., both off-grid and grid applications). Other embodiments include different interior solutions or uses than those listed.

FIGS. 14-29 illustrate another exemplary embodiment of a nanogrid device 110 for off-grid power generation. Similar to the nanogrid drive 10, the nanogrid device 110 device may be used (e.g., as a mobile generator) to generate power for a variety of purposes, including to provide primary power at a selected destination, to provide auxiliary power at a selected destination such as a utility provider, and/or to provide an electrical vehicle (EV) charging station at a selected destination. The nanogrid device 110 may be used at a variety of different selected destinations. The nanogrid device 110 may also be positioned on top, or form part of, a trailer (e.g., dual axle trailer) during transport of the nanogrid device 110 to the selected destination.

With continued reference to FIGS. 14-29, in the illustrated embodiment, the nanogrid device 110 includes a housing 114. The housing 114 may have a variety of shapes. For example, the housing 114 may form a generally elongate rectangular box (similar to the housing 14) having a first end, a second, opposite end, a front portion, a rear portion, and/or side portions, and may define an interior portion.

In some embodiments, the nanogrid device 110 includes at least one electronic component (e.g., controller, circuitry, or other electronic component, similar to the electronic component 58 described above). The electronic component may be coupled to the housing 114, and may be disposed for example within the interior portion, or may be coupled to an exterior of the housing 114.

In some embodiments, the housing 114 may include wireless communications equipment (e.g., similar to wireless communications equipment 74) connected for example to the electronic component (e.g., to an electronic circuitry of the electronic component) for receiving and/or transmitting at least one wireless communication signal from a remote location. The wireless communications equipment may include sensors that monitor one or more aspects of the nanogrid device 110. Thus, similar to the nanogrid device 10, the nanogrid device 110 may be monitored and/or controlled remotely.

The nanogrid device 110 may additionally include a back-up source of power, such as a hydrogen fuel cell or cells (similar to the fuel cell 78) disposed on or within the housing 114. Similar to the nanogrid device 10, the nanogrid device 110 may additionally include a hydrogen generation unit (e.g., similar to the hydrogen generation unit 82) that generates hydrogen for the hydrogen fuel cell or cells.

With continued reference to FIGS. 14-29, in the illustrated embodiment the nanogrid device 110 includes one or more energy-receiving components in the form of solar doors 162 (e.g., a first stack of three solar doors 162 coupled to one side portion and a second stack of three solar doors 162 coupled to a second side portion). The solar doors 162 are in a stored position in FIGS. 14 and 15 and are in a fully deployed position in FIGS. 28 and 29. Each solar door 162 may include one or more solar panels 164 (FIG. 19) disposed thereon that receive energy from the sun and convert the energy from the sun into electrical energy. The solar panels 164 may face inwardly into the housing 114 in the stored position (e.g., to inhibit damage to the solar panels 164). The solar doors 162 may define a solar array. In some embodiments, one or more of the solar doors 162 may form a fully integrated array having an inverter, charge controller, solar combiner, battery storage, and/or electronics.

Figure 28:
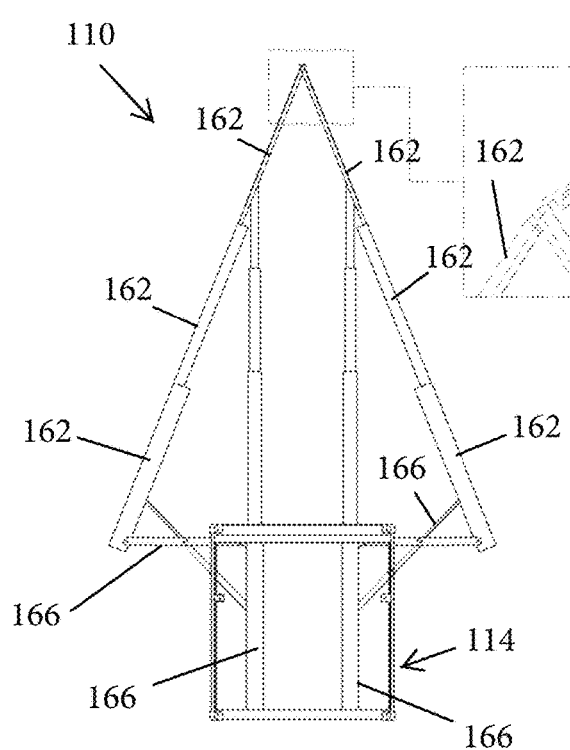
FIGS. 28 and 29 are front and perspective views of the nanogrid device of FIGS. 14 and 15, illustrating a seventh deployment step.
Figure 29:
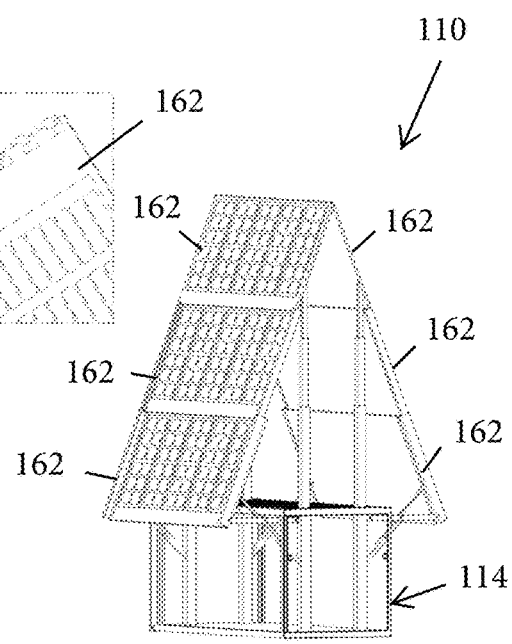

The solar doors 162 may include or be coupled to electronic actuators, telescopic poles, magnetic locks, and/or high-tension spring mechanisms to open and deploy the nanogrid device 110 (e.g., into a general A-frame configuration as seen in FIGS. 28 and 29). In the illustrated embodiment, the nanogrid device 110 includes supporting frame members 166 (e.g., telescoping poles) that support the solar doors 162. In the illustrated embodiment, two of the supporting frame members 166 are positioned at least partially within the housing 114, and extend (e.g., telescope) vertically upwardly (e.g., up and out of the housing 114), to support the solar doors 162. Other embodiments include different numbers of supporting frame members 166 positioned within the housing (e.g., four supporting frame members 166, or only a single supporting frame member 166). In the illustrated embodiment, additional supporting frame members 166 are linked/pivoted to the solar doors 162, such that the solar doors 162 may be opened sequentially between a first deployed position (FIGS. 16 and 17), a second deployed position (FIGS. 18 and 19), a third deployed position (FIGS. 20 and 21), a fourth deployed position (FIGS. 22 and 23), a fifth deployed position (FIGS. 24 and 25), a sixth deployed position (FIGS. 26 and 27), and a seventh deployed position (FIGS. 28 and 29). As illustrated in FIG. 28, in the final, seventh deployed position the vertical supporting frame members 166 may engage or otherwise be positioned adjacent lower surfaces of the two upper-most solar doors 162, to provide added stability. Additionally, in the final, seventh deployed position the two upper-most solar doors 162 may mesh and/or interlock with one another.

Although various embodiments have been described in detail with reference to certain examples illustrated in the drawings, variations and modifications exist within the scope and spirit of one or more independent aspects described and illustrated.

What is claimed is:

1. A nanogrid device for off-grid power, the nanogrid device comprising:
   a housing having a first side portion and a second side portion disposed opposite the first side portion; and
   a plurality of energy-receiving components movable relative to the housing from a first, stored position to a second, fully deployed position, the plurality of energy receiving components comprising at least a first stack of energy-receiving components that are slidable relative to one another and coupled to the first side portion of the housing and a second stack of energy-receiving components that are slidable relative to one another and coupled to the second side portion of the housing, wherein each of the first stack of energy receiving components and the second stack of energy-receiving components has a top edge;
   wherein the each of the energy-receiving components of the first stack of energy-receiving components and each of the energy-receiving components of the second stack of energy-receiving components is a solar door having a first surface and a second surface, and
   wherein the top edge of the firsts stack of energy-receiving components is disposed in contact with the top edge of the second stack of energy receiving components at an apex to thereby form an A-frame structure in the second, fully deployed position, and wherein the housing is configured to be disposed underneath the A-frame structure in the second, fully deployed position.

2. The nanogrid device of claim 1, wherein each of the solar doors includes a solar panel disposed on the first surface thereof.

3. The nanogrid device of claim 1, further comprising an electronic component coupled to each of the energy-receiving components, wherein the electronic component is configured to receive energy from the energy-receiving components.

4. The nanogrid device of claim 3, wherein the electronic component is a controller, and wherein each of the energy-receiving components includes a solar panel.

5. The nanogrid device of claim 4, wherein controller is coupled to the housing.

6. The nanogrid device of claim 1, further comprising a hydrogen fuel cell disposed within the housing, a hydrogen generation unit coupled to the hydrogen fuel cell, and a hydrogen storage tank coupled to the hydrogen fuel cell.

7. A nanogrid device for off-grid power, the nanogrid device comprising:
   a housing having a first side portion and a second side portion disposed opposite the first side portion;
   a first stack of energy-receiving components coupled to the first side portion of the housing; and
   a second stack of energy-receiving components coupled to the second side portion of the housing, wherein each of the first stack of energy-receiving components and the second stack of energy receiving components has a top edge;
   wherein the energy-receiving components of the first stack of energy-receiving components are slidable relative to one another and wherein each of the energy receiving components of the first stack of energy-receiving components is a solar door;
   wherein the energy-receiving components of the second stack of energy receiving components are slidable relative to one another and wherein each of the energy receiving components of the second stack of energy-receiving components is a solar door; and
   wherein the first stack of energy-receiving components and the second stack of energy receiving components are movable relative to the housing from a first, stored position to a second, fully deployed position, and wherein the top edge of the first stack energy-receiving components is disposed in contact with and the top edge of the second stack of energy receiving components at an apex to thereby form an A-frame structure in the second, fully deployed position, and wherein the housing is configured to be disposed underneath the A-frame structure in the second, fully deployed position.

8. The nanogrid device of claim 7, wherein each solar door defines a first surface and a second surface, and wherein each solar door includes a solar panel disposed on the first surface thereof.

9. The nanogrid device of claim 7, further comprising supporting frame members coupled to the solar doors and configured to support the solar doors.

10. The nanogrid device of claim 9, wherein the supporting frame members are pivotally coupled to one another and to the housing.

11. The nanogrid device of claim 9, wherein each of the supporting frame members is a telescopic pole.

12. The nanogrid device of claim 7, further comprising a plug-in for an electric vehicle to charge the electric vehicle, wherein the plug-in is coupled to both the first stack of energy-receiving components and the second stack of energy-receiving components and is configured to receive power from both the first stack of energy-receiving components and the second stack of energy-receiving components.

13. The nanogrid device of claim 12, further comprising a controller, wherein the controller is coupled to both the first stack of energy-receiving components and the second stack of energy-receiving components and is configured to receive power from both the first stack of energy-receiving components and the second stack of energy-receiving components.

14. The nanogrid device of claim 7, further comprising a controller configured to control sliding movement of the first stack of energy-receiving components and the second stack of energy-receiving components.

15. The nanogrid device of claim 13, further comprising wireless communications equipment coupled to the controller to receive and transmit wireless communications signals to a remote location, wherein the wireless communication equipment is configured to permit the nanogrid device to be monitored and controlled remotely.

16. The nanogrid device for off-grid power of claim 1, further comprising:

a hydrogen fuel cell disposed within the housing;
a hydrogen generation unit coupled to the hydrogen fuel cell; and
a hydrogen storage tank coupled to the hydrogen fuel cell.

17. The nanogrid device of claim 16, wherein the hydrogen generation unit is arranged such that at least a portion of the energy generated by the solar doors is configured to be used to produce hydrogen through electrolysis within the hydrogen generation unit, wherein the hydrogen is configured to be stored in the hydrogen storage tank, and wherein the hydrogen in the hydrogen storage tank is configured to later be used by the hydrogen fuel cell to produce back-up power for the nanogrid device.

18. The nanogrid device of claim 2, wherein:
in the first, stored position, the first surface of the solar door comprising the first stack of energy-receiving components faces the first side portion of the housing and the first surface of the solar door comprising the second stack of energy receiving components faces the second side portion of the housing; and
in the second, fully deployed position, the second surface of the solar door comprising the first stack of energy-receiving components faces the housing and the second surface of the solar door comprising the second stack of energy receiving components faces the housing.

* * * * *